(No Model.)
G. JANSSEN.
APPARATUS FOR COOLING CANDLE MOLDS.
No. 380,205. Patented Mar. 27, 1888.
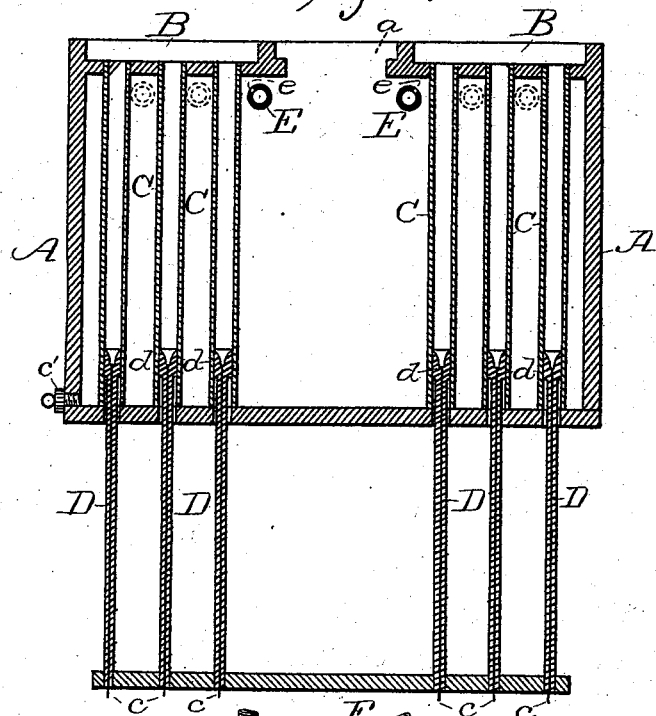
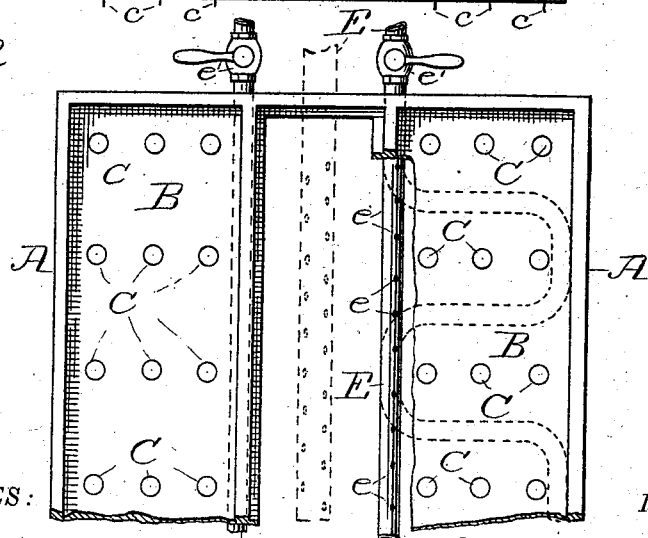
WITNESSES:
D. W. Coan
Wm. T. Collins
INVENTOR
Gustave Janssen,
BY Frank D. Thomason
ATTORNEY.

UNITED STATES PATENT OFFICE.

GUSTAVE JANSSEN, OF CHICAGO, ILLINOIS, ASSIGNOR OF ONE-HALF TO JOHN P. FITZGERALD, OF SAME PLACE.

APPARATUS FOR COOLING CANDLE-MOLDS.

SPECIFICATION forming part of Letters Patent No. 380,205, dated March 27, 1888.

Application filed May 24, 1887. Serial No. 239,176. (No model.)

*To all whom it may concern:*

Be it known that I, GUSTAVE JANSSEN, of Chicago, Cook county, Illinois, have invented certain new and useful Improvements in Methods of and Means for Cooling Candle-Molds, of which the following is a full, clear, and exact description, reference being had to the accompanying drawings and letters of reference marked thereon.

Heretofore it has been customary when manufacturing candles to cool the molds either by a blast of air or by flooding the cooling-box into which said molds depend with water. The former process is objectionable because too long a time is occupied in sufficiently cooling the molds before the removal of the candles, and because the slow reduction of the temperature of the candle-stock in the molds causes crystallization, which gives the candle a spotted appearance, and thus depreciates its marketable value. The latter or water-cooling process, which, as stated, is accomplished by filling the cooling-box into which the candle-molds depend with water, is objectionable, because heretofore the candle-stock in the molds became cool long before the candle-stock in the troughs, which latter must be perfectly solid before the candles could be removed. This cooling of the candles before the stock in said trough constitutes the principal objection to the existing water process. There is, however, this further objection to it—viz., that by precipitating the cold body of water direct into the box the sudden cooling and consequent contraction of the candle-stock in the molds causes the candles to break.

The object of my invention is to cool the larger mass of candle-stock in the trough first, thus enabling me to accomplish the cooling of the entire apparatus in much less space of time than has heretofore been possible. By my process, as will appear, I cool the molds simultaneously, so that by the time the stock in the trough is cool the candles in the molds are likewise cool, and this I do in such manner as to gradually cool the molds, avoiding sudden changes of temperature, and consequent breaking of the candles.

Figure 1 is a transverse vertical section of the upper part of a candle-molding machine having my invention applied thereto, and Fig. 2 is a plan view of the same.

Reference being had to the drawings, A represents a cooling-box; B B, candle-stock troughs made longitudinally on both sides the center and partially covering the top of said cooling-box, in such manner as to leave a longitudinal opening between them, which is generally covered by a cover, *a*.

Having their mouths flush with the bottom of the trough B, and depending vertically downward therefrom into and to the bottom of the cooling-box, are series of candle-molds C C. These candle-molds are cylindrical in form, and have passing longitudinally into their lower packed ends the pistons D, the heads *d* of which have conical-shaped depressions in their extremities, which form the tips of the candles. Passing centrally and longitudinally up through these pistons and through the molds are wick-braids *c c*, around which the candle is formed.

The operation of making candles is briefly as follows: The candle-stock is poured, in a hot liquid form, into trough B sufficient to fill the molds and leave about one inch depth of the mass therein. After cooling sufficiently the pistons are simultaneously pushed upward, thus forcing the newly-made candles up into a clamping device which holds them suspended directly above the molds. Before, however, the candles are thus pushed upward, the candle-stock in the troughs is removed in a solid state, and as said candles move upward they draw the wick-braid up after them. A fresh supply of candle-stock is then poured into the trough, and when this mass has sufficiently filled the molds and cooled the wicks connecting the candles in the clamps above are cut, the filled clamp removed, the troughs again emptied, and the last batch of candles forced up into another clamp. This process is repeated over and over again.

I do not wish to be understood as claiming as part of my invention any of the mechanism features heretofore alluded to, but only the method and means for accomplishing the proper cooling of the candle-stock in the molds before their removal from the cooling-box. This I accomplish by means of pipes E E, which enter the cooling-box from one end and pass longitudinally alongside of or immediately under the bottom plate of said troughs B. They are provided with a series of perforations therein, made at such a radius that when water is pumped into said pipes it is forced out of said perforations in jets, which spurt up against the bottom plates of the troughs, from whence it trickles down around the molds and drops into the cooling-box, slowly filling the same. When, however, the cold water issuing from pipes E strikes the heated bottom plate of the trough, the chill is taken off of it, indeed; it may thus become quite warm. This warmth will not equal the temperature of the molds down which it gravitates into the cooling-box. It therefore reduces the temperature of said molds, although not so suddenly as to break the candles. Of course the longer the jets of water from pipes E play upon the bottom plate of the trough the cooler said plate becomes and the cooler the water is that gravitates down around the molds. This cooling process is continued, cooling both troughs and molds at the same time until their temperature is such that the candle-stock in the troughs can be removed in a perfectly solid state, as likewise the candles, as hereinbefore set forth. After each molding operation, subsequent cooling of the molding apparatus, and removal therefrom of the solid candle-stock in the trough and the candles from the mold, the water in the cooling-box is withdrawn and the box charged with live steam, so as to reheat the molds to about the temperature of the hot liquid candle-stock to be poured into them. This must be done before the refilling of the molds can be repeated.

I do not wish to be confined to the exact location of pipes E, or to their number, because it is immaterial so long as the water is first thrown against the bottom plates of the troughs, as before described; and for the same reason I do not consider it material whether the pipe is straight or curved in and out around the molds depending down from said troughs or otherwise.

It will be understood that some device to supply or shut off the water from pipes E is necessary. I therefore provide a valve or cock, $e'$, for this purpose. When it is desired to drain the water from the cooling-box, I open the outlet-valve $c'$ therein, as shown.

In addition to the advantages the use of my improved cooling method accomplishes, as stated in the preamble or statement, is the fact that the stock in the newly-molded candles is so white that the bleaching of them by exposure to the light for from two to five days is obviated, and is the further fact that the molding of the candles is so perfect and the gloss so good that the necessity for a polishing-machine is entirely done away with.

The saving to the manufacturer by reason of the above advantages is very great, first, because of the great gain of time; second, because of the dispensing with the polishing-machine, which is very complicated and expensive, and, third, because of the great saving of labor.

What I claim as new is—

1. In a candle-molding machine, the combination, with the candle-stock troughs B, molds depending therefrom, and cooling-box, of the pipes E, adapted to project water against the bottom of said trough, as set forth.

2. In a candle-molding machine, the combination, with the candle-stock troughs B, molds depending therefrom, and cooling-box A, of the pipes E, having perforations therein and adapted to project jets of water against the bottoms of said troughs, as and for the purpose set forth.

GUSTAVE JANSSEN.

In presence of—
FRANK D. THOMASON,
J. P. FITZGERALD.